(12) United States Patent
Seto et al.

(10) Patent No.: US 11,965,901 B2
(45) Date of Patent: Apr. 23, 2024

(54) MANAGEMENT SYSTEM, MANAGEMENT METHOD, AND DUMMY CONTAINER

(71) Applicant: FUJIFILM CORPORATION, Tokyo (JP)

(72) Inventors: Yoshihiro Seto, Kanagawa (JP); Haruyasu Nakatsugawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 438 days.

(21) Appl. No.: 17/372,552

(22) Filed: Jul. 12, 2021

(65) Prior Publication Data

US 2022/0018865 A1 Jan. 20, 2022

(30) Foreign Application Priority Data

Jul. 15, 2020 (JP) ................................ 2020-121722

(51) Int. Cl.
*G01N 35/00* (2006.01)
*G06V 20/00* (2022.01)

(52) U.S. Cl.
CPC ... *G01N 35/00732* (2013.01); *G01N 35/0092* (2013.01); *G06V 20/00* (2022.01); *G01N 2035/00831* (2013.01)

(58) Field of Classification Search
None
See application file for complete search history.

(56) References Cited

U.S. PATENT DOCUMENTS

2004/0076999 A1\* 4/2004 Faeldt .................. G06T 7/20
435/6.1
2012/0160039 A1 6/2012 Tatsutani
(Continued)

FOREIGN PATENT DOCUMENTS

JP S59-116046 A 7/1984
JP 2001-108690 A 4/2001
(Continued)

OTHER PUBLICATIONS

English language translation of the following: Office action dated May 9, 2023 from the JPO in a Japanese patent application No. 2020-121722 corresponding to the instant patent application. This office action translation is submitted now in order to supplement the understanding of the cited references which are being disclosed in the instant Information Disclosure Statement.

*Primary Examiner* — Delomia L Gilliard
(74) *Attorney, Agent, or Firm* — SOLARIS Intellectual Property Group, PLLC

(57) ABSTRACT

A management system including a processor, the processor is configured to acquire an image obtained by imaging an outer surface of each of plural sample containers and a boundary container, the sample container containing a sample and in which subject information of a subject from whom the sample is collected is given to the outer surface, the boundary container in which group boundary information indicating a boundary between plural groups of subjects is given to the outer surface, recognize the subject information and the group boundary information based on the image, and associate a test result related to the sample contained in each of the sample containers with a test order which includes the subject information and in which the group is divided corresponding to the group boundary
(Continued)

information, based on a result of the recognition and the test order.

15 Claims, 20 Drawing Sheets

(56) References Cited

U.S. PATENT DOCUMENTS

| | | | | |
|---|---|---|---|---|
| 2017/0185815 A1* | 6/2017 | Itoh | ............ | G06K 7/1413 |
| 2017/0329922 A1* | 11/2017 | Eberting | ............ | G16H 40/67 |
| 2020/0043577 A1* | 2/2020 | Jiang | ............ | G16H 10/60 |
| 2022/0018863 A1* | 1/2022 | Hirota | ............ | G06V 30/412 |
| 2023/0223126 A1* | 7/2023 | Eberting | ............ | G06Q 30/0601 |
| | | | | 705/2 |
| 2023/0360790 A1* | 11/2023 | Burkholz | ............ | A61B 10/0096 |

FOREIGN PATENT DOCUMENTS

| | | | |
|---|---|---|---|
| JP | 2010-216868 A | 9/2010 | |
| JP | 2012-141149 A | 7/2012 | |
| JP | 2012141149 A * | 7/2012 | ............ G01N 1/2813 |

\* cited by examiner

FIG. 6

TEST ORDER (COMPANY P)

| SUBJECT ID | NAME | GENDER | AGE |
|---|---|---|---|
| P101 | ICHIRO FUJI | MALE | 37 |
| P102 | ICHIRO FUJI | MALE | 50 |
| P103 | TARO SANYO | MALE | 25 |
| ⋮ | ⋮ | ⋮ | ⋮ |

TEST ORDER (COMPANY Q)

| SUBJECT ID | NAME | GENDER | AGE |
|---|---|---|---|
| Q101 | JIRO SANYO | MALE | 21 |
| Q102 | HANAKO FUJI | FEMALE | 29 |
| ⋮ | ⋮ | ⋮ | ⋮ |

FIG. 7

TEST ORDER

TEST ORDER (COMPANY P)

| SUBJECT ID | NAME | GENDER | AGE | REMARKS |
|---|---|---|---|---|
| P101 | ICHIRO FUJI | MALE | 37 | |
| P102 | ICHIRO FUJI | MALE | 50 | |
| P103 | TARO SANYO | MALE | 25 | |
| ... | ... | ... | ... | ... |

FIG. 8

NAME ICHIRO FUJI (MALE)/FEMALE 37 YEARS OLD A  100  13
4 MONTH 25 DAY 2019 YEAR 18 HOUR

NAME ICHIRO FUJI (MALE)/FEMALE 50 YEARS OLD B  100  13
4 MONTH 26 DAY 2019 YEAR 7 HOUR

FIG. 9

TEST ORDER

TEST ORDER (COMPANY P)

| SUBJECT ID | NAME | GENDER | AGE | REMARKS |
|---|---|---|---|---|
| P101 | ICHIRO FUJI | MALE | 37 | A |
| P102 | ICHIRO FUJI | MALE | 50 | B |
| P103 | TARO SANYO | MALE | 25 | |
| ... | ... | ... | ... | ... |

IMAGE AND TEST RESULT

| TEST ID | LABEL IMAGE | MEASURED VALUE |
|---|---|---|
| 0001 | NAME ICHIRO FUJI (MALE/FEMALE) 37 YEARS OLD | 5 |
| 0002 | NAME ICHIRO FUJI (MALE/FEMALE) 50 YEARS | 101 |
| 0003 | NAME TARO SANYO (MALE/FEMALE) 25 YEARS OLD | 8 |
| 0004 | NAME HANAKO FUJI (MALE/FEMALE) 29 YEARS OLD | 0 |
| 0005 | NAME JIRO SANYO (MALE/FEMALE) 21 YEARS OLD | 6 |
| ⋮ | ⋮ | ⋮ |

| TEST ID | LABEL IMAGE | NAME | GENDER | AGE | REMARKS |
|---|---|---|---|---|---|
| 0001 | NAME ICHIRO FUJI (MALE/FEMALE) 37 YEARS OLD A | ICHIRO FUJI | MALE | 37 | A |
| 0002 | NAME ICHIRO FUJI (MALE/FEMALE) 50 YEARS OLD B | ICHIRO FUJI | MALE | 50 | B |
| 0003 | NAME TARO SANYO (MALE/FEMALE) 25 YEARS OLD | TARO SANYO | MALE | 25 | |
| 0004 | NAME HANAKO FUJI (MALE/FEMALE) 29 YEARS OLD | HANAKO FUJI | FEMALE | 29 | |
| 0005 | NAME JIRO SANYO (MALE/FEMALE) 21 YEARS OLD | JIRO SANYO | MALE | 21 | |
| ... | ... | ... | ... | ... | ... |

RECOGNITION RESULT 55, 100

FIG. 13

TEST ORDER (COMPANY P)

| SUBJECT ID | NAME | GENDER | AGE | REMARKS |
|---|---|---|---|---|
| P101 | ICHIRO FUJI | MALE | 37 | A |
| P102 | ICHIRO FUJI | MALE | 50 | B |
| P103 | TARO SANYO | MALE | 25 | |
| ... | ... | ... | ... | ... |

TEST ORDER (COMPANY Q)

| SUBJECT ID | NAME | GENDER | AGE | REMARKS |
|---|---|---|---|---|
| Q101 | JIRO SANYO | MALE | 21 | |
| Q102 | HANAKO FUJI | FEMALE | 29 | |
| ... | ... | ... | ... | ... |

RECOGNITION RESULT AND TEST RESULT 55

| TEST ID | LABEL IMAGE | NAME | GENDER | AGE | REMARKS | MEASURED VALUE |
|---|---|---|---|---|---|---|
| 0001 | NAME ICHIRO FUJI MALE/FEMALE 37 YEARS A | ICHIRO FUJI | MALE | 37 | A | 5 |
| 0002 | NAME ICHIRO FUJI MALE/FEMALE 50 YEARS B | ICHIRO FUJI | MALE | 50 | B | 101 |
| 0003 | NAME TARO SANYO MALE/FEMALE 25 YEARS OLD | TARO SANYO | MALE | 25 | | 8 |
| 0004 | NAME HANAKO FUJI MALE/FEMALE 29 YEARS OLD | HANAKO FUJI | FEMALE | 29 | | 0 |
| 0005 | NAME JIRO SANYO MALE/FEMALE 21 YEARS OLD | JIRO SANYO | MALE | 21 | | 6 |
| ... | | ... | ... | ... | ... | ... |

FIG. 14

TEST RESULT REPORT

COMPANY P

| SUBJECT ID | NAME | GENDER | AGE | TEST ID | LABEL IMAGE | MEASURED VALUE |
|---|---|---|---|---|---|---|
| P101 | ICHIRO FUJI | MALE | 37 | 0001 | NAME ICHIRO FUJI  MALE/FEMALE 37 YEARS A | 5 |
| P102 | ICHIRO FUJI | MALE | 50 | 0002 | NAME ICHIRO FUJI  MALE/FEMALE 50 YEARS B | 101 |
| P103 | TARO SANYO | MALE | 25 | 0003 | NAME TARO SANYO  MALE/FEMALE 25 YEARS OLD | 8 |
| ... | ... | ... | ... | ... | ... | ... |

COMPANY Q

| SUBJECT ID | NAME | GENDER | AGE | TEST ID | LABEL IMAGE | MEASURED VALUE |
|---|---|---|---|---|---|---|
| Q101 | JIRO SANYO | MALE | 21 | 0005 | NAME JIRO SANYO  MALE/FEMALE 21 YEARS OLD | 6 |
| Q102 | HANAKO FUJI | FEMALE | 29 | 0004 | NAME HANAKO FUJI  MALE/FEMALE 29 YEARS OLD | 0 |
| ... | ... | ... | ... | ... | ... | ... |

TEST ORDER (COMPANY P)

| SUBJECT ID | NAME | GENDER | AGE |
|---|---|---|---|
| P201 | ICHIRO FUJI | MALE | 37 |
| P202 | TARO SANYO | MALE | 25 |
| ⋮ | ⋮ | ⋮ | ⋮ |

TEST ORDER (COMPANY Q)

| SUBJECT ID | NAME | GENDER | AGE |
|---|---|---|---|
| Q201 | ICHIRO FUJI | MALE | 50 |
| Q202 | JIRO SANYO | MALE | 21 |
| Q203 | HANAKO FUJI | FEMALE | 29 |
| ⋮ | ⋮ | ⋮ | ⋮ |

FIG. 19

RECOGNITION RESULT AND TEST RESULT 55

| TEST ID | LABEL IMAGE | NAME | GENDER | AGE | REMARKS | MEASURED VALUE |
|---|---|---|---|---|---|---|
| 0001 | NAME ICHIRO FUJI (MALE)/FEMALE 37 YEARS OLD | ICHIRO FUJI | MALE | 37 | P | 5 |
| 0002 | NAME TARO SANYO MALE/FEMALE 25 YEARS OLD | TARO SANYO | MALE | 25 | | 8 |
| 0003 | NAME HANAKO FUJI MALE/(FEMALE) 29 YEARS OLD | HANAKO FUJI | FEMALE | 29 | Q | 0 |
| 0004 | NAME ICHIRO FUJI (MALE)/FEMALE 50 YEARS OLD | ICHIRO FUJI | MALE | 50 | | 101 |
| 0005 | NAME JIRO SANYO (MALE)/FEMALE 21 YEARS OLD | JIRO SANYO | MALE | 21 | | 6 |
| ... | ... | ... | ... | ... | ... | ... |

(Last four columns grouped as 104)

TEST ORDER (COMPANY P)

| SUBJECT ID | NAME | GENDER | AGE |
|---|---|---|---|
| P201 | ICHIRO FUJI | MALE | 37 |
| P202 | TARO SANYO | MALE | 25 |
| ... | ... | ... | ... |

TEST ORDER (COMPANY Q)

| SUBJECT ID | NAME | GENDER | AGE |
|---|---|---|---|
| Q201 | ICHIRO FUJI | MALE | 50 |
| Q202 | JIRO SANYO | MALE | 21 |
| Q203 | HANAKO FUJI | FEMALE | 29 |
| ... | ... | ... | ... |

FIG. 20

| | | |
|---|---|---|
| | NAME | MALE FEMALE YEARS OLD |
| | MONTH DAY YEAR HOUR | |

NAME ICHIRO FUJI (MALE) 37 YEARS OLD
4 MONTH 25 DAY 2019 YEAR 18 HOUR

NAME TARO SANYO (MALE) 25 YEARS OLD
4 MONTH 25 DAY 2019 YEAR 10 HOUR

NAME — MALE FEMALE — YEARS OLD
MONTH DAY YEAR HOUR

NAME HANAKO FUJI MALE (FEMALE) 29 YEARS OLD
4 MONTH 26 DAY 2019 YEAR 6 HOUR

NAME ICHIRO FUJI (MALE) 50 YEARS OLD
4 MONTH 26 DAY 2019 YEAR 7 HOUR

NAME JIRO SANYO (MALE) 21 YEARS OLD
4 MONTH 26 DAY 2019 YEAR 7 HOUR

NAME — MALE FEMALE — YEARS OLD
MONTH DAY YEAR HOUR

FIG. 21

RECOGNITION RESULT AND TEST RESULT 55

| TEST ID | LABEL IMAGE | NAME | GENDER | AGE | MEASURED VALUE |
|---|---|---|---|---|---|
| - | NAME ☐  MALE FEMALE  YEARS OLD | - | - | - | - |
| 0001 | NAME ICHIRO FUJI  (MALE) FEMALE  37 YEARS OLD | ICHIRO FUJI | MALE | 37 | 5 |
| 0002 | NAME TARO SANYO  (MALE) FEMALE  25 YEARS OLD | TARO SANYO | MALE | 25 | 8 |
| - | NAME ☐  MALE FEMALE  YEARS OLD | - | - | - | - |
| 0003 | NAME HANAKO FUJI  MALE (FEMALE)  29 YEARS OLD | HANAKO FUJI | FEMALE | 29 | 0 |
| 0004 | NAME ICHIRO FUJI  (MALE) FEMALE  50 YEARS OLD | ICHIRO FUJI | MALE | 50 | 101 |
| 0005 | NAME JIRO SANYO  (MALE) FEMALE  21 YEARS OLD | JIRO SANYO | MALE | 21 | 6 |
| - | NAME ☐  MALE FEMALE  YEARS OLD | - | - | - | - |
| ... | ... | ... | ... | ... | ... |

TEST ORDER (COMPANY P)

| SUBJECT ID | NAME | GENDER | AGE |
|---|---|---|---|
| P201 | ICHIRO FUJI | MALE | 37 |
| P202 | TARO SANYO | MALE | 25 |
| ... | ... | ... | ... |

TEST ORDER (COMPANY Q)

| SUBJECT ID | NAME | GENDER | AGE |
|---|---|---|---|
| Q201 | ICHIRO FUJI | MALE | 50 |
| Q202 | JIRO SANYO | MALE | 21 |
| Q203 | HANAKO FUJI | FEMALE | 29 |
| ... | ... | ... | ... |

FIG. 22

NAME  MALE  102
      FEMALE  YEARS OLD
MONTH  DAY  YEAR  HOUR

FIG. 23

NAME  MALE  102
      FEMALE  YS OLD
MONTH  DAY  YEAR  HOUR

NAME  MALE  102
      FEMALE  YES OLD
MONTH  DAY  YEAR  HOUR

FIG. 24

104  102
NAME  P  MALE
      FEMALE  YEARS OLD
MONTH  DAY  YEAR  HOUR 104  102
NAME  Q  MALE
      FEMALE  YEARS OLD
MONTH  DAY  YEAR  HOUR

MANAGEMENT SYSTEM, MANAGEMENT METHOD, AND DUMMY CONTAINER

CROSS-REFERENCE TO RELATED APPLICATIONS

The present application claims priority under 35 U.S.C. § 119 to Japanese Patent Application No. 2020-121722, filed on Jul. 15, 2020. The above application is hereby expressly incorporated by reference, in its entirety, into the present application.

BACKGROUND

Technical Field

The present disclosure relates to a management system, a management method, and a dummy container.

Related Art

In the related art, various tests such as a fecal occult blood test and a blood test have been performed. In some of these tests, for example, an institution that performs a test such as a testing institution and an institution that uses the test results such as a hospital may be different.

For example, in the case of a fecal occult blood test, a subject collects a sample such as feces and submits it to the hospital. The hospital provides the testing institution with a test order including information such as name, gender, and age to specify each subject, as well as samples submitted by plural subjects. The testing institution performs tests on each of plural samples provided by the hospital, and notifies the hospital and/or the subject by associating the subject with the test result, based on the test order received from the hospital.

That is, the testing institution is performing the work of associating the test result related to the sample in a sample container containing the sample with the test order. In the related art, this work has been performed by a method such as manually attaching a barcode or the like issued based on a test order to a corresponding sample container of a subject and reading the barcode at the time of testing the sample.

In addition, for example, as a technique for sorting samples according to the group to which the subject belongs, there is disclosed a technique in which a sorter information displayed by a barcode or the like is attached to a container to be contained, and the samples are sorted and transported based on the sorter information (see JP2001-108690A).

Further, there is disclosed a technique for checking a possibility that a sample is misplaced so that the sample is not misplaced due to the same surname and the same name (see JP2010-216868A).

SUMMARY

In recent years, in order to improve the efficiency of the above-mentioned test work, there is a demand for a technique capable of appropriately associating a test result related to a sample contained in a sample container with a test order without giving an identification unit such as a barcode to the sample container. Further, in such a case, there is a demand for a technique capable of appropriately associating a test result with a test order even though plural sample containers included in each of plural different test orders are collectively set in a test device.

The present disclosure has been made in view of the above circumstances, and an object of the present disclosure is to provide a management system, a management method, and a dummy container capable of efficiently and appropriately associating a test result with a test order.

A management system according to an aspect of the present disclosure comprises at least one processor. The processor is configured to acquire an image obtained by imaging an outer surface of each of plural sample containers and a boundary container, the sample container containing a sample and in which subject information of a subject from whom the sample is collected is given to the outer surface, the boundary container in which group boundary information indicating a boundary between plural groups of subjects is given to the outer surface in a case where there are the plurality of groups and the samples are continuously tested for the plurality of groups, recognize the subject information given to each of the sample containers and the group boundary information given to the boundary container based on the image, and associate a test result related to the sample contained in each of the sample containers with a test order which includes the subject information and in which the group is divided corresponding to the group boundary information, based on a result of the recognition and the test order.

In the management system according to the aspect of the present disclosure, the boundary container may be a sample container containing a sample to be tested at at least one of first or last in the group.

In the management system according to the aspect of the present disclosure, the boundary container may be a dummy container which does not contain a sample.

In the management system according to the aspect of the present disclosure, the group boundary information may include group discrimination information for discriminating a group to which the subject belongs, and the processor may be configured to further recognize the group discrimination information based on the image, and associate the test result related to the sample contained in each of the sample containers with the test order further including the group discrimination information, based on a result of the recognition and the test order.

In the management system according to the aspect of the present disclosure, the group boundary information may be represented by at least one of a character or a symbol.

In the management system according to the aspect of the present disclosure, a fact that subject information is not entered on an outer surface of the dummy container may be used as the group boundary information.

In the management system according to the aspect of the present disclosure, the processor may be configured to perform control such that the test result and the test order are displayed on a display in association with each other.

In the management system according to the aspect of the present disclosure, the processor may be configured to generate a label image for each of plural the subjects by extracting an area including the subject information from the image, and perform control such that the label image, the test result, and the test order are displayed on a display in association with each other based on the subject information included in the label image.

A management method according to another aspect of the present disclosure comprises acquiring an image obtained by imaging an outer surface of each of plural sample containers and a boundary container, the sample container containing a sample and in which subject information of a subject from whom the sample is collected is given to the outer surface, the boundary container in which group boundary information indicating a boundary between plural groups of subjects is given to the outer surface in a case where there are the plurality of groups and the samples are continuously tested for the plurality of groups, recognizing the subject information given to each of the sample containers and the group boundary information given to the boundary container based on the image, and associating a test result related to the sample contained in each of the sample containers with a test order which includes the subject information and in which the group is divided corresponding to the group boundary information, based on a result of the recognition and the test order.

A dummy container according to another aspect of the present disclosure in which group boundary information indicating a boundary between plural groups is given to an outer surface in a case where plural sample containers each containing a sample and in which subject information of a subject from whom the sample is collected is given to an outer surface are divided into the plurality of groups to which the subject belongs and the samples are continuously tested for the plurality of groups.

In the dummy container according to the aspect of the present disclosure, the group boundary information may include group discrimination information for discriminating a group to which the subject belongs.

In the dummy container according to the aspect of the present disclosure, the group boundary information may be represented by at least one of a character or a symbol.

In the dummy container according to the aspect of the present disclosure, a fact that subject information is not entered on the outer surface of the dummy container may be used as the group boundary information.

In the dummy container according to the aspect of the present disclosure, the dummy container preferably has a shape that is stored in a test device for testing the sample contained in the sample container.

In the dummy container according to the aspect of the present disclosure, the dummy container preferably has a shape similar to a shape of the sample container.

According to the aspects of the present disclosure, it is possible to provide a management system, a management method, and a dummy container capable of efficiently and appropriately associating a test result with a test order.

BRIEF DESCRIPTION OF THE DRAWINGS

FIG. 6 is a diagram showing an example of a test order according to a first embodiment.

FIG. 7 is a diagram showing an example of a screen in which subjects having the same surname and the same name are highlighted and displayed.

FIG. 8 is a diagram showing an example of a sample container to which subject discrimination information is given.

FIG. 9 is a diagram showing an example of a test order including subject discrimination information.

FIG. 11 is a diagram showing an example of a test result and an image obtained by imaging a sample container.

FIG. 12 is a diagram showing an example of a recognition result of an image obtained by imaging a sample container.

FIG. 13 is a diagram illustrating a process of associating a test result with a test order.

FIG. 14 is a diagram showing an example of a screen in which a test result and a test order are displayed in association with each other.

FIG. 17 is a diagram showing an example of a test order according to a second embodiment.

FIG. 19 is a diagram illustrating a process of associating a test result with a test order.

FIG. 20 is a diagram showing an example of a dummy container to which group boundary information is given.

FIG. 21 is a diagram illustrating a process of associating a test result with a test order.

FIG. 22 is a diagram showing an example of a dummy container to which group boundary information is given.

FIG. 23 is a diagram showing an example of a dummy container to which group boundary information is given.

FIG. 24 is a diagram showing an example of a dummy container to which group boundary information is given.

DESCRIPTION OF EMBODIMENTS

Hereinafter, each embodiment of the present disclosure will be described in detail with reference to the drawings.

First Embodiment

Figure 1:
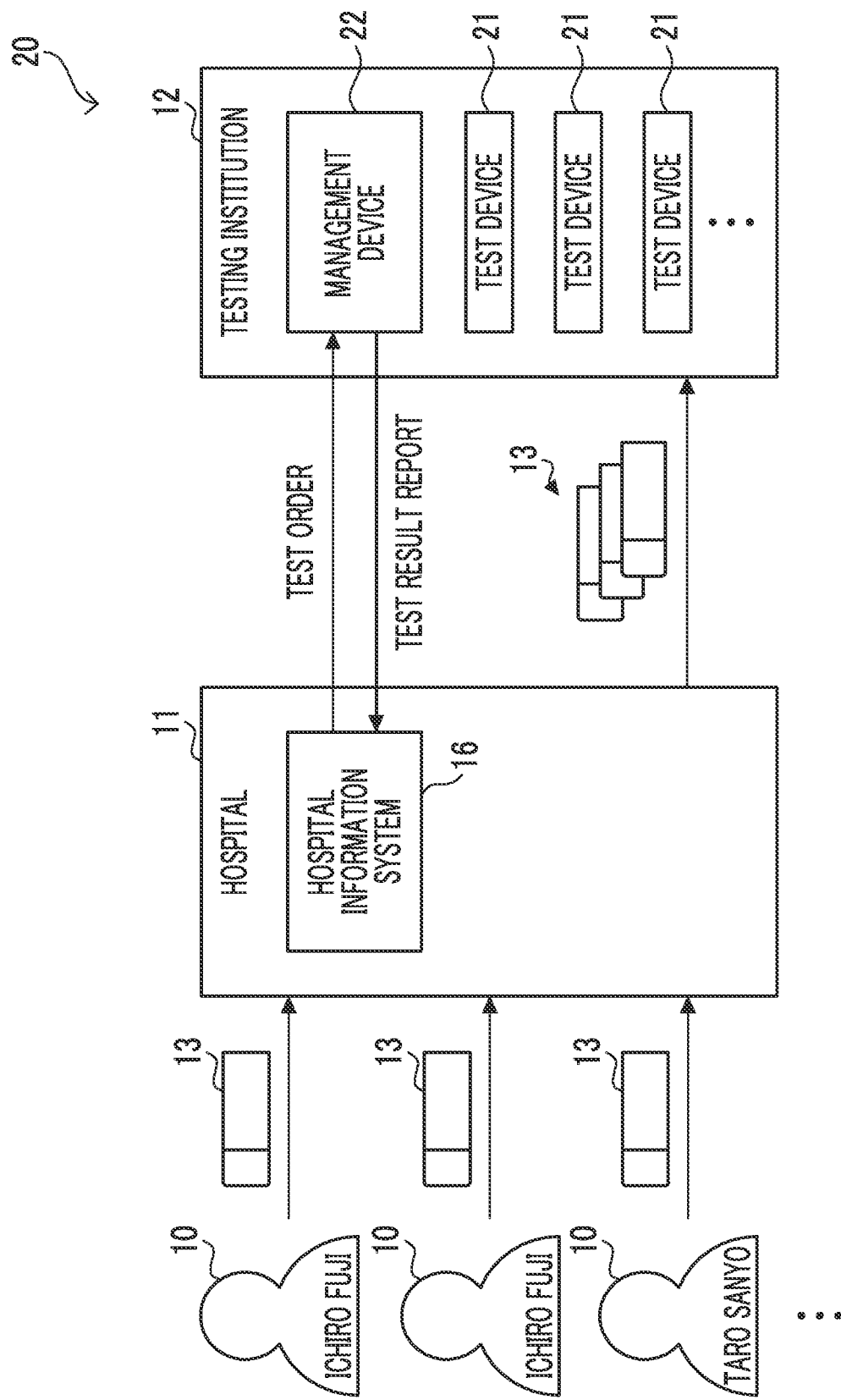
FIG. 1 is a diagram showing an example of a configuration of a management system according to each embodiment.

First, the configuration of a management system 20 of the present disclosure will be described with reference to FIG. 1. As shown in FIG. 1, in various medical-related tests such as a fecal occult blood test or a blood test (hereinafter, simply referred to as a "test"), a hospital 11 visited by a subject 10 for a health diagnosis, other tests, or diagnosis, and a testing institution 12 which is a separate organization from the hospital 11 are involved.

The subject 10 collects a sample to be used for the test, contains the collected sample in a dedicated container (hereinafter, referred to as a "sample container") 13, and submits it to the hospital 11. The sample is the body tissue or secretions of the subject 10. For example, in the fecal occult blood test, the sample is the feces of the subject 10. In the blood test, the sample is the blood of the subject 10. Hereinafter, for the sake of description, it is assumed that the test to be performed is specifically a fecal occult blood test.

On the other hand, the hospital 11 usually requests a test to the testing institution 12, which is a specialized institution for a test. For example, the hospital 11 issues a test request (hereinafter, referred to as a "test order"; details will be described later) to the testing institution 12 by using a hospital information system (HIS) 16 or the like. Further, the hospital 11 sends the sample container 13 containing the sample to the testing institution 12.

Figure 2:
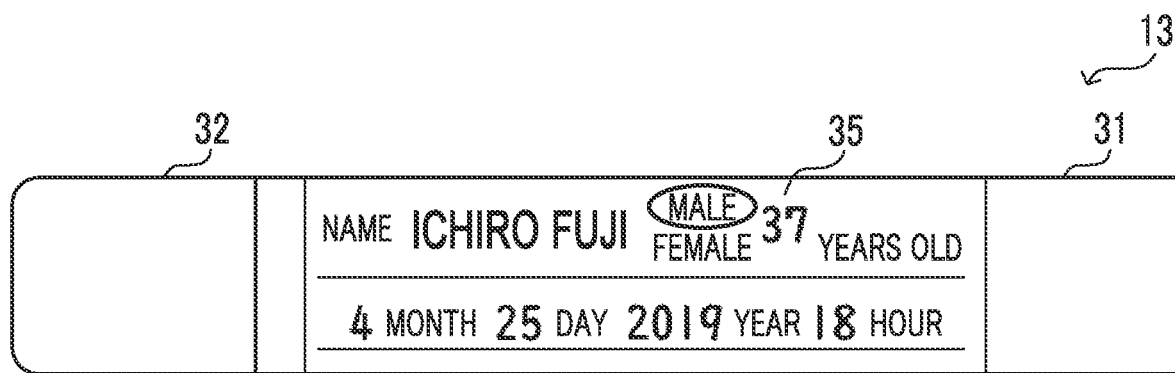
FIG. 2 is a diagram showing an example of a sample container for a fecal occult blood test.

FIG. 2 is a diagram showing a stool collection container as an example of the sample container 13. The sample container 13 is a container made into a kit so that the subject 10 can collect stool by himself/herself and store it stably for a certain period of time. As shown in FIG. 2, the sample container 13 comprises a container body 31 for containing feces as a sample, and a cap 32 attachably and detachably provided on the container body 31. The container body 31 is, for example, transparent or translucent, and contains a diluent and/or a storage solution of feces as a sample therein. An insertion part (not shown) to be inserted into the container body 31 is attached to the cap 32. Therefore, the subject 10 removes the cap 32 from the container body 31, collects feces by tracing the surface of the feces as a sample with the distal end of the insertion part, inserts the insertion part into the container body 31, and closes the cap 32 to thereby collect the feces as a sample.

In the sample container 13, a label 35 is attached to the outer surface of the container body 31, and the subject 10 can enter various information including his/her own name information thereon. That is, at least the name information of the subject from whom the sample contained in the sample container 13 is collected is given to the outer surface of the sample container 13. In the example of FIG. 2, the label 35 is provided with a name entry field ("Ichiro Fuji" in FIG. 2), a gender selection field ("male" in FIG. 2), an age entry field ("37 years old" in FIG. 2), and a stool collection date and time entry field ("month: 4 day: 25 year: 2019 hour: 18" in FIG. 2).

Since the fecal occult blood test is usually performed using feces for two days, two types of labels 35 in different colors may be used to distinguish the sample containers 13 for two days related to the same person. For example, the characters indicating the name entry field ("name"), the characters indicating the gender selection field ("male" and "female"), the characters indicating the age entry field ("years old"), the characters indicating the stool collection date and time entry field ("month", "day", "year", and "hour"), and/or other ruled lines may be different in color. Hereinafter, for the sake of simplification of the description, only one sample container 13 related to the same subject 10 will be described.

The testing institution 12 comprises at least one test device 21, and a management device 22. The management system 20 according to an aspect of the present disclosure includes the management device 22 and some or all of the test devices 21. The testing institution 12 may comprise plural types of test devices 21 depending on the type of test to be performed. For example, in a case where the testing institution 12 supports a fecal occult blood test and a blood test, it may comprise two types of test devices 21, a fecal occult blood test device and a blood test device.

Figure 3:
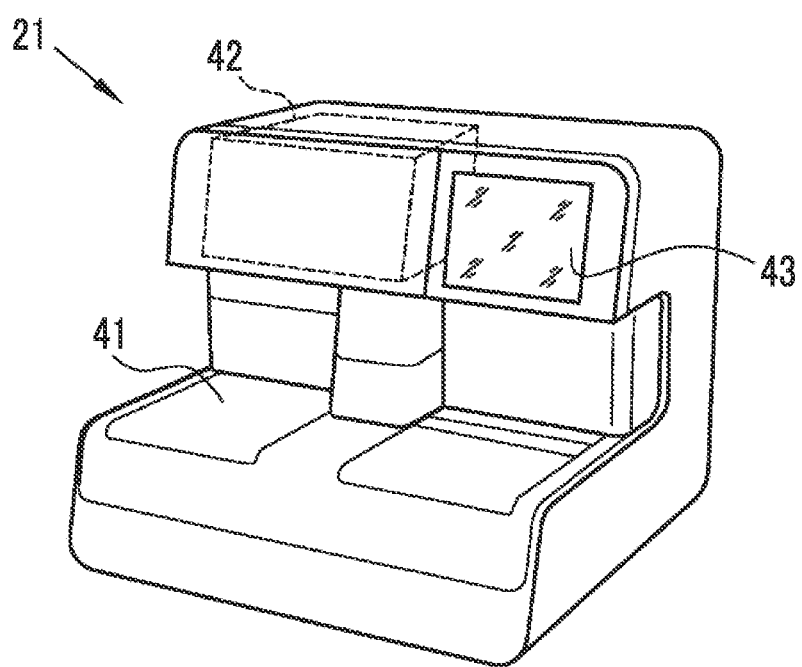
FIG. 3 is a perspective view showing an example of a fecal occult blood test device (test device).

FIG. 3 is a perspective view showing a fecal occult blood test device as an example of the test device 21. The test device 21 comprises a sample container placing portion 41, a test unit 42 which is a substantive mechanism for performing a test, and a touch panel 43 which functions as an operation unit and a display unit of the test device 21. The test device 21 includes, for example, a central processing unit (CPU), a read only memory (ROM), a random access memory (RAM), and the like.

Figure 10:
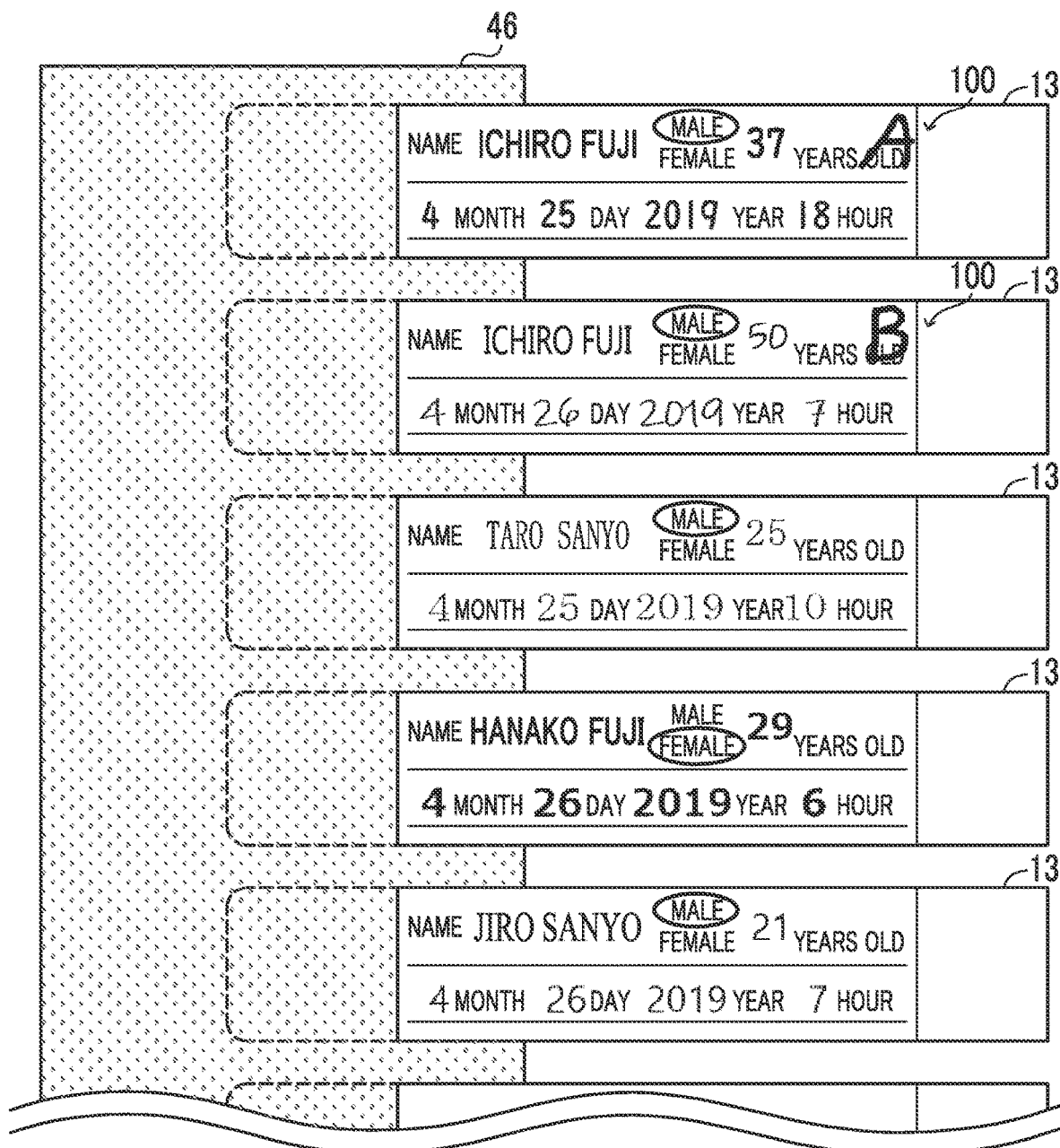
FIG. 10 is a diagram showing an example of a state in which a sample container is housed in a rack.

The sample container placing portion 41 is a portion on which one or plural sample containers 13 are placed in a case of performing a test. In the present embodiment, as shown in FIG. 10, plural sample containers 13 are set in a rack 46 that holds a portion related to subject information in a state of not being hidden in the rack 46, and the plurality of sample containers 13 are placed on the sample container placing portion 41 together with the rack 46. The plurality of sample containers 13 related to the same subject 10 may be set in one rack 46, but in the following description, it is assumed that the sample containers 13 set in the rack 46 are submitted by different subjects 10.

Figure 5:
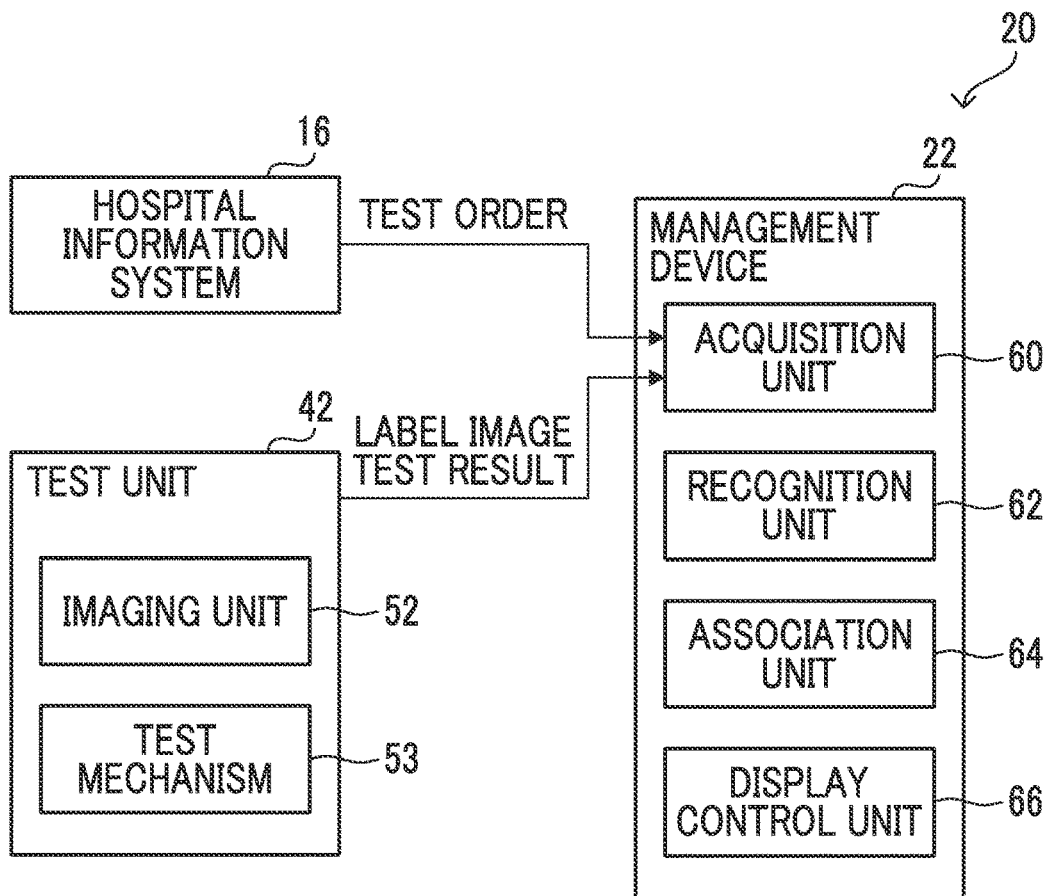
FIG. 5 is a block diagram showing an example of a functional configuration of the management device according to each embodiment.

As shown in FIG. 5, the test unit 42 comprises an imaging unit 52 and a test mechanism 53. The test mechanism 53 is a mechanism for sequentially performing a fecal occult blood test on the samples contained in the plurality of sample containers 13 set in the rack 46, and includes a stock of reagents used for the fecal occult blood test. In a case where the test is completed, the test mechanism 53 may control the touch panel 43 to sequentially display the test result, the progress of the test, and the like.

The imaging unit 52 includes an imaging device such as a camera. The imaging unit 52 images an area including name information and subject discrimination information 100 (details will be described later) given to the outer surface of the sample container 13 to obtain an image at the timing of providing the sample contained in each sample container 13 to the test mechanism 53. The imaging unit 52 may image the plurality of sample containers 13 set in the rack 46 individually, or image some or all of the plurality of sample containers 13 set in the rack 46 together. In addition, the imaging unit 52 generates a label image 55 for each of the plurality of subjects 10 by extracting an area including the name information from the image obtained by imaging the subjects.

The test device 21 outputs a test result obtained by the test mechanism 53 and the label image 55 of the sample container 13 in which the sample for which the test result is obtained is contained to the management device 22 in association with each other (see FIG. 11).

An ID (IDentifier) may be given to the rack 46 by using a barcode, an IC chip, or the like (not shown) so that the test device 21 can individually recognize the rack 46. According to such a form, the sample container 13 and the test result can be managed for each rack 46, so that confusion can be suppressed.

Figure 4:
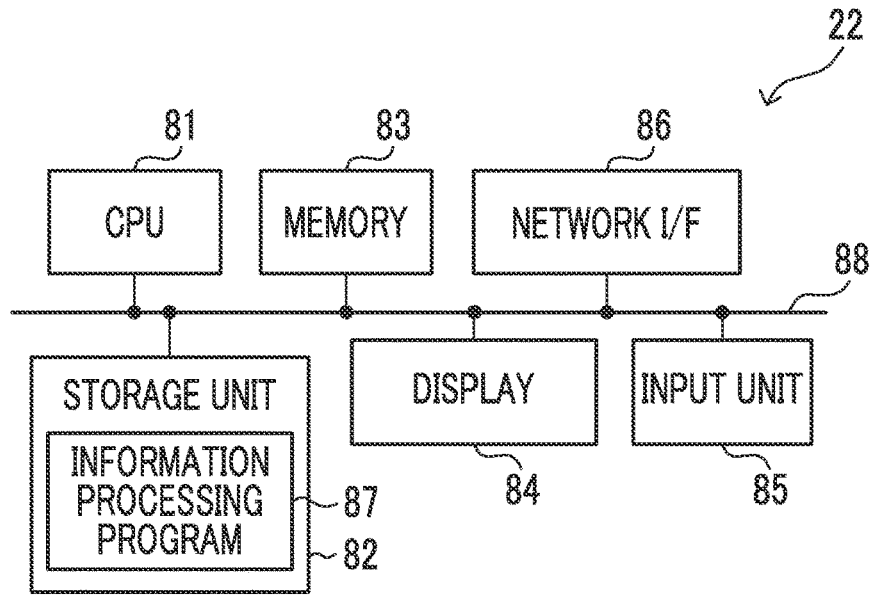
FIG. 4 is a block diagram showing an example of a hardware configuration of a management device according to each embodiment.

Next, a hardware configuration of the management device 22 according to the present embodiment will be described with reference to FIG. 4. As shown in FIG. 4, the management device 22 includes a CPU 81, a non-volatile storage unit 82, and a memory 83 as a temporary storage area. Further, the management device 22 includes a display 84 such as a liquid crystal display and an organic electro luminescence (EL) display, an input unit 85 such as a keyboard and a mouse, and a network interface (I/F) 86 connected to a network. The CPU 81, the storage unit 82, the memory 83, the display 84, the input unit 85, and the network I/F 86 are connected to a bus 88. The CPU 81 is an example of the processor in the present disclosure.

The storage unit 82 is realized by a storage device such as a hard disk drive (HDD), a solid state drive (SSD), and a flash memory. An information processing program 87 is stored in the storage unit 82 as the storage medium. The CPU 81 reads out the information processing program 87 from the storage unit 82, loads the read-out program into the memory 83, and executes the loaded information processing program 87.

Next, a functional configuration of the management device 22 according to the present embodiment will be described with reference to FIGS. 5 to 14. As shown in FIG. 5, the management device 22 includes an acquisition unit 60, a recognition unit 62, an association unit 64, and a display control unit 66. The CPU 81 executes the information processing program 87, and thus, the management device 22 functions as the acquisition unit 60, the recognition unit 62, the association unit 64, and the display control unit 66.

As shown in FIG. 5, the acquisition unit 60 acquires a test order from the hospital information system 16. FIG. 6 shows an example of a test order. As shown in FIG. 6, the test order includes information of a subject 10 who performs a test, that is, a subject 10 who collects a sample (hereinafter, referred to as "subject information"). The subject information may include at least name information of the subject 10, information such as the gender and age of the subject 10, a subject ID assigned to each subject 10, and the like. In addition, the test order may include information indicating the target and contents of the test to be performed.

The test order is created for each group to which the subject belongs, such as a company and a school. FIG. 6 shows an example in which test orders are created for each of "Company P" and "Company Q" as an example of the group. The test order may include information on the group to which the subject belongs as the subject information.

FIG. 7 is a diagram showing an example of a screen displayed on the display 84 in a case where plural subjects having the same surname and the same name are included in the test order. The display control unit 66 determines whether or not the test order acquired by the acquisition unit 60 includes plural subjects having the same surname and the same name and performs control such that the plurality of subjects having the same surname and the same name are highlighted and displayed on the display 84 in a case where the test order includes the plurality of subjects having the same surname and the same name. In the example of FIG. 7, two people with the same surname and the same name of "Ichiro Fuji" are highlighted and displayed with a different background color. The process by the display control unit 66 is performed prior to the process of imaging the outer surface of the sample container 13 by the above-mentioned test device 21.

In a case where the tester checks that the test order includes plural subjects 10 having the same surname and the same name based on the screen displayed on the display 84, the tester gives the subject discrimination information 100 to the outer surface of the sample container 13 related to the subject 10 having the same surname and the same name. The subject discrimination information 100 is information for discriminating the plurality of subjects 10 having the same surname and the same name, and a different character string (for example, an identification number or the like) may be given to each of the plurality of subjects 10 having the same surname and the same name. The tester discriminates the subject 10 having the same surname and the same name based on the subject information other than the name information, such as age information and gender information, for example.

In the example of FIG. 8, among the sample containers 13 of "Ichiro Fuji" having the same surname and the same name, "A" is given to the sample container 13 to which "age: 37" is given as age information and "B" is given to the sample container 13 to which "age: 50" is given as age information. That is, the subject discrimination information 100 is given only to the sample container 13 of the subject 10 having the same surname and the same name among the plurality of sample containers 13.

Further, as shown in FIG. 9, the tester adds the same subject discrimination information 100 as the subject discrimination information 100 given to the outer surface of the sample container 13 related to the subject 10 having the same surname and the same name to the "remarks" field of the test order. That is, at this time point, the test order includes at least the name information and the same subject discrimination information 100 as that given to the outer surface of the sample container 13.

After that, as shown in FIG. 10, the tester sets the plurality of sample containers 13 to be tested in the rack 46 and causes the test device 21 to test the samples with the subject discrimination information 100 given to the outer surface of the sample container 13 related to the subject 10 having the same surname and the same name. The order in which the sample containers 13 are arranged on the rack 46 is random, and may be different from the order registered in the test order.

It is preferable that the above process performed on the subjects 10 having the same surname and the same name is performed not only on the subjects having the same surname and the same name but also on plural subjects 10 having similar names such as the same sound and different characters. For example, this is because, in a case where each of the plurality of subjects 10 having names with the same sound and different characters describes their names on the outer surface of the sample container 13 with a notation different from the name notation registered in the test order (for example, hiragana), it is preferable to improve the accuracy of discrimination by the subject discrimination information 100.

The acquisition unit 60 acquires the test result and the label image 55 from the test device 21. As described above, the label image 55 and the test result are output from the test device 21 in association with each other as shown in FIG. 11. In the example of FIG. 11, a "measured value" is shown as an example of the test result. In addition, the example of FIG. 11 also includes a "test ID" corresponding to the label image 55 and the test result. The "test ID" represents the order in which the tests were performed (or the order in which the test results were acquired), and is attached to, for example, a set of the label image 55 and the test result in a case where the acquisition unit 60 acquires the label image 55 and the test result corresponding to each other.

Based on the label image 55, the recognition unit 62 recognizes the subject information including at least the name information and the subject discrimination information 100 given to each sample container 13. Specifically, the recognition unit 62 has a character recognition function such as optical character recognition/reader (OCR). FIG. 12 shows the name information ("name") recognized by the recognition unit 62 based on the label image 55, the subject information including information regarding gender and age, and the subject discrimination information 100 ("remarks").

The recognition unit 62 may perform control to issue a warning in a case where the sample container related to plural subjects having the same surname and the same name to which the subject discrimination information 100 is not given is recognized based on the label image 55. Control to issue a warning includes, for example, displaying a warning on the display 84 and emitting a sound in a case where the management device 22 comprises a speaker.

The association unit 64 associates the test result related to the sample contained in each sample container 13 with a test order to which the subject discrimination information 100 is added by the tester, based on the recognition result of the recognition unit 62 (see FIG. 12) and the test order (see FIG. 9). Here, the "association" between the test result and the test order refers to specifying the test result related to the sample of the specific sample container 13 as the test result related to the specific test order. In other words, the "association" is substantially synonymous with specifying the specific sample container 13 as the sample container 13 related to the specific test order, and/or identifying that the specific subject 10 who provided the sample of a specific sample container 13 is the subject 10 related to the specific test order. This is because, in a case where one of these is associated, the other is automatically determined. Further, since the sample container 13 has a one-to-one correspondence with the label image 55, the association between the sample container 13 and the test order can be rephrased as the association between the label image 55 and the test order.

The association unit 64 collates a part or all of the recognition result of the recognition unit 62 with the corresponding item of the test order. Then, as shown in FIG. 13, the test order in which contents of the subject information included in the recognition result and the test order in common match each other is associated with the label image 55 that has performed the recognition process and the test result.

In addition, in a case where there is no test order in which the contents of the subject information included in the recognition result and the test order in common match each other, the association unit 64 may associate a test order having a high match rate among the partially matching test orders with the set of the label image 55 that has performed the recognition process and the test result. That is, the association unit 64 may collate the recognition result of the label image 55 with the test order, and presume that the test order having a good match rate (for example, the highest match rate) of the subject information is the test order corresponding to the set of the label image 55 that has performed the recognition process and the test result to perform association. In this case, even in a case where the label image 55 is poorly recognized, the association that is tentatively considered to be the most accurate can be performed.

Further, in a case where the recognition unit 62 recognizes plural pieces of subject information, the association unit 64 may set a priority among the pieces of subject information. For example, in a case where the recognition unit 62 recognizes the name, gender, and age of the subject 10 from the label image 55, the association unit 64 may prioritize the name of the subject 10 among these information and associate the name with the test order. Since the probability that the name of the subject 10 matches the other subject 10 is lower than the probability that the gender and age match the other subject 10, by giving priority to the degree of matching of names, it becomes easy to make an accurate association even in a case where the subject information does not completely match.

As shown in FIG. 14, the display control unit 66 performs control such that the label image 55, the test result, and the test order are displayed on the display 84 in association with each other. The display of the label image 55 may be omitted. Further, the management device 22 may transmit a test result report as shown in FIG. 14 to the hospital information system 16 or the like of the hospital 11.

Figure 15:
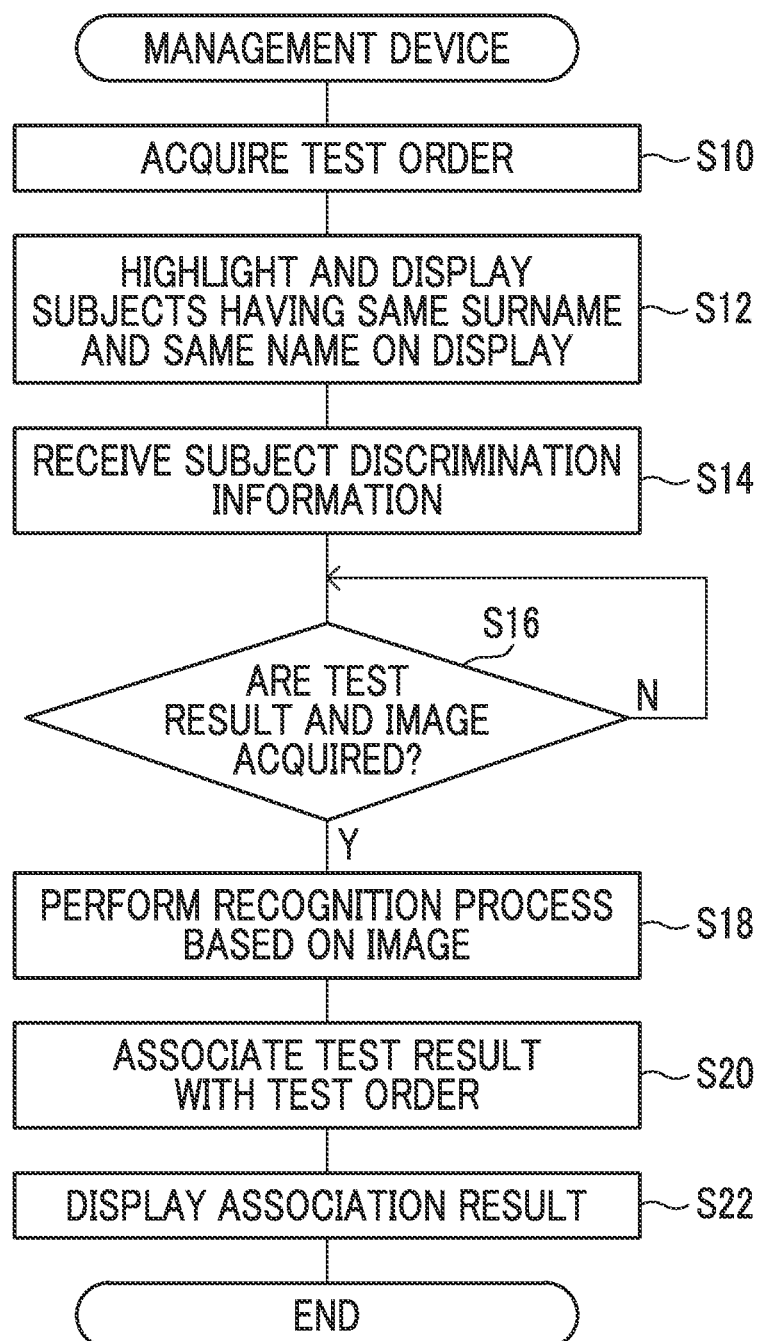
FIG. 15 is a flowchart showing an example of a process in the management device.

Next, an operation of the management device 22 according to the present embodiment will be described with reference to FIG. 15. The CPU 81 executes the information processing program 87, and thus, the process shown in FIG. 15 is executed. The process shown in FIG. 15 is executed in a case where, for example, an operator such as a tester inputs an instruction to start a test via the input unit 85.

In Step S10 of FIG. 15, the acquisition unit 60 acquires a test order from the hospital information system 16. In Step S12, the display control unit 66 performs control such that the plurality of subjects 10 having the same surname and the same name are highlighted and displayed on the display 84 in a case where the test order includes the plurality of subjects 10 having the same surname and the same name. In Step S14, the display control unit 66 receives the input of the subject discrimination information 100 to the test order by the operator. In Step S16, the acquisition unit 60 waits until the test result and the image are acquired from the test device 21.

Here, the process performed by the test device 21 between the above-mentioned Steps S14 and S16 will be described with reference to FIG. 16. The process shown in FIG. 16 is executed in a case where, for example, an operator such as a tester inputs an instruction to start a test via the touch panel 43.

Figure 16:
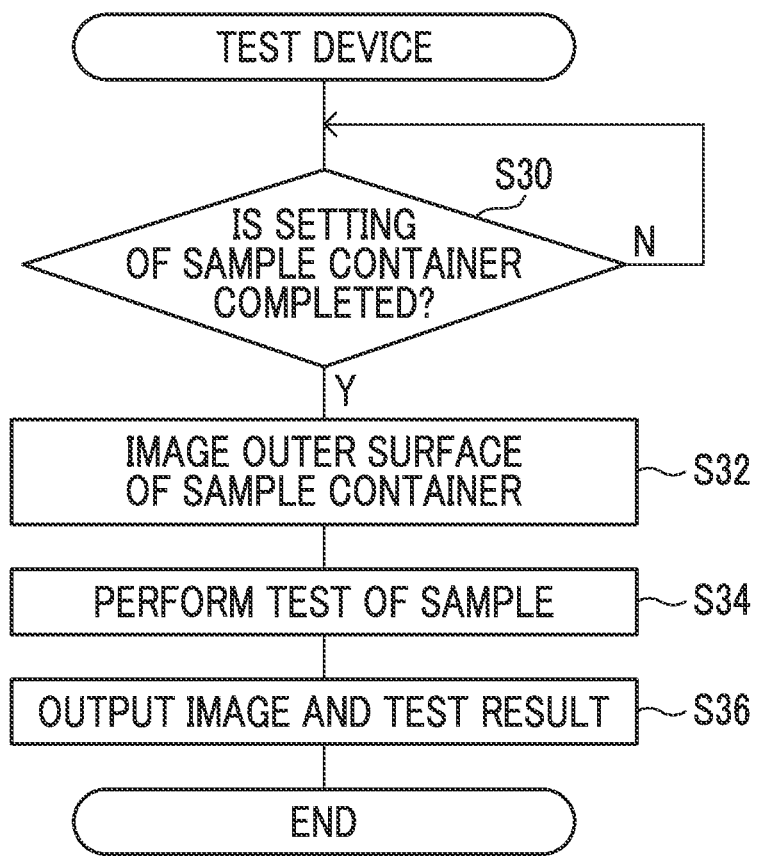
FIG. 16 is a flowchart showing an example of a process in the test device.

In Step S30 of FIG. 16, the test device 21 determines whether or not the sample container 13 is set in the sample container placing portion 41. In a case where the sample container 13 is set in the sample container placing portion 41 (Step S30 is Y), in Step S32, the imaging unit 52 images an area including name information and subject discrimination information 100 given to the outer surface of the sample container 13 to obtain an image. In Step S34, the test mechanism 53 performs the test of the sample. In Step S36, the test device 21 outputs the image obtained in Step S32 and the test result obtained in Step S34 in association with each other to the management device 22. The process of Step S32 and the process of Step S34 may be performed in parallel or may be performed in a different order.

Referring back to FIG. 15, a description will be given. In Step S18 of FIG. 15, the recognition unit 62 recognizes the name information and the subject discrimination information 100 given to each sample container 13 based on the image acquired in Step S16. In Step S20, the association unit 64 associates the test result related to the sample contained in each sample container 13 with the test order in which the subject discrimination information 100 is input in Step S14 based on the recognition result in Step S18 and the test order. In Step S22, the display control unit 66 performs control such that the test result and the test order associated in Step S20 are displayed on the display 84 in association with each other.

As described above, the management system 20 according to the present embodiment is a management system including at least one processor, and the processor is configured to acquire an image obtained by imaging an outer surface of each of the plurality of sample containers 13 which contain a sample and to which name information of the subject 10 from whom the sample is collected and the subject discrimination information 100 for discriminating plural subjects having the same surname and the same name are given to the outer surface. In addition, the management system 20 recognizes the name information and the subject discrimination information 100 given to each of the sample containers 13 based on the image, and associates a test result related to the sample contained in each of the sample containers 13 with a test order including the name information and the subject discrimination information 100, based on a result of the recognition and the test order. According to such a form, it is possible to efficiently and appropriately associate a test result with a test order even in a case where there are the plurality of subjects 10 having the same surname and the same name.

In the above embodiment, the form in which the subject discrimination information 100 is given to the sample container 13 according to the subject 10 having the same surname and the same name has been described. However, the present disclosure is not limited thereto, any form in which the subject 10, the sample container 13, and the test order can be associated with each other can be employed. For example, in a case where the sample container 13 related to the subject 10 having the same surname and the same name is set in the rack 46, a dummy container to which the subject discrimination information 100 is given may be set in at least one of the front and rear of the sample container 13 related to the subject 10 having the same surname and the same name. Even in such a form, the recognition unit 62 can recognize the subject discrimination information 100 of the corresponding sample container 13 from the image obtained by imaging the dummy container.

Second Embodiment

In the first embodiment, even in a case where there are plural subjects 10 having the same surname and the same name in the same test order, the management system 20 and the management method capable of efficiently and appropriately associating the test results with the test orders have been described. That is, as described above, since the test order is created for each group to which the subject belongs, the management system 20 that can handle the case where there are plural subjects 10 having the same surname and the same name in the same group has been described.

In the present embodiment, a case where plural subjects 10 having the same surname and the same name do not exist in the same test order (that is, the same group), and plural subjects 10 having the same surname and the same name exist in different test orders (that is, different groups) will be described. FIG. 17 shows an example in which two "Ichiro Fuji" having the same surname and the same name exist in different test orders (that is, different groups) of company P and company Q. Hereinafter, the same components as those in the first embodiment will be designated by the same symbols, and the description thereof will be omitted.

Usually, the test in the test device 21 is performed in the order of test order by the tester setting the sample container 13 in the rack 46 for each test order (that is, for each group). On the other hand, in order to improve the efficiency of the test work, especially in a case where the rack 46 has an empty space, it is desired that the sample containers 13 included in plural different groups are set in the same rack 46 and continuously tested. In such a case, in a case where the boundary between the groups can be determined, in a case where the plurality of subjects 10 having the same surname and the same name are included in different groups, the association can be performed without giving the subject discrimination information 100 described in the first embodiment.

Therefore, in the present embodiment, in a case where there are plural groups of subjects and samples are continuously tested for the plurality of groups, the boundary between the groups is determined by using a boundary container in which the group boundary information 102 indicating the boundary between the plurality of groups is given on the outer surface. The group boundary information 102 may include group discrimination information 104 for discriminating the group to which the subject 10 belongs. The group boundary information 102 and the group discrimination information 104 are represented by at least one of a character or a symbol.

The boundary container is, for example, a sample container 13 containing a sample to be tested at at least one of first or last in the group. Hereinafter, an example in which the group boundary information 102 is given to the outer surface of the sample container 13 containing the sample to be tested first in each group as an example of the boundary container will be described.

Figure 18:
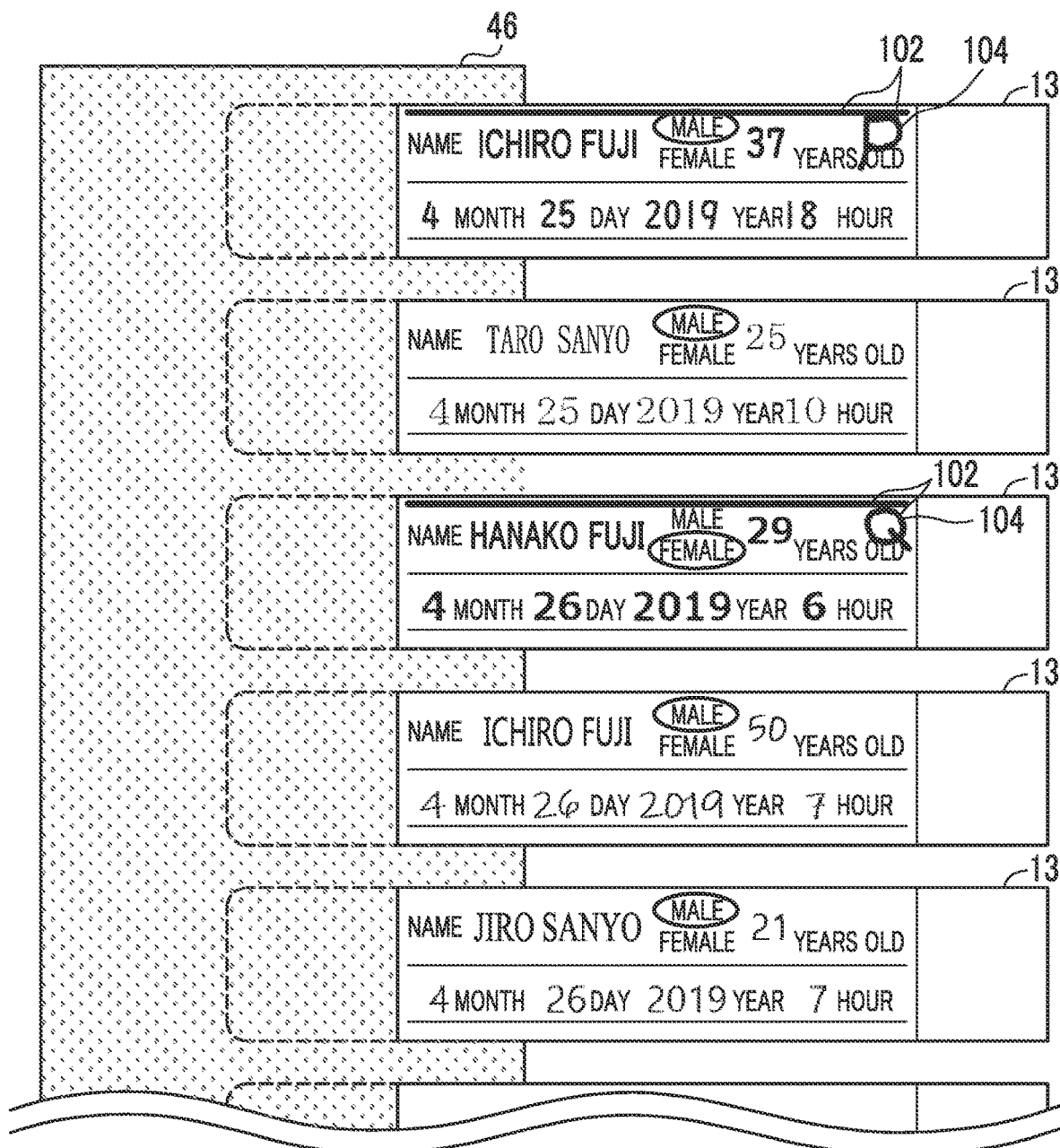
FIG. 18 is a diagram showing an example of a sample container to which group boundary information is given.

FIG. 18 shows an example in which one line as an example of the group boundary information 102 and the characters "P" and "Q" are given to the first sample container 13 of each group of company P and company Q, respectively. Of these, the characters "P" and "Q" also function as the group discrimination information 104 for discriminating the groups of company P and company Q, respectively.

As shown in FIG. 18, the tester gives the group boundary information 102 to the first sample container 13 of the group, sets the information in the rack 46, and executes the test by the test device 21. The sample container 13 is set in the rack 46 in the order of test order so that company P comes first and company Q comes later, for example, as a bundle for each group. That is, the test is performed for each group in the order of test order. The order in which the sample containers 13 are arranged in each group is random, and may be different from the order registered in the test order.

The acquisition unit 60 acquires the test result and the label image 55 from the test device 21. The label image 55 includes subject information, and group boundary information 102. Further, the group boundary information 102 may include the group discrimination information 104.

The recognition unit 62 recognizes the subject information given to each sample container 13 and the group boundary information 102 given to the boundary container based on the label image 55. Further, in a case where the group boundary information 102 includes the group discrimination information 104, the recognition unit 62 recognizes the group discrimination information 104.

The association unit 64 determines that the sample container 13 recognized that the group boundary information 102 is given to the label image 55 is the first sample container 13 of each group of company P and company Q. As shown in FIG. 19, the association unit 64 associates a test result related to the sample contained in each of the sample containers 13 with the test order in which the group is divided corresponding to the group boundary information 102, based on the recognition result of the recognition unit 62 and the test order.

Here, the "test order in which the group is divided corresponding to the group boundary information 102" means, for example, the test order created for each group as described above. Further, for example, it means a test order in which information on the group to which the subject 10 belongs is included for each of the plurality of subjects 10. Further, for example, in a case where one test order includes plural groups, it means the test order including the information indicating the boundary of the group represented by a predetermined character string and blanks at the boundary between the groups.

As described above, the test is performed for each group in order of test order. Therefore, even in a case where the group boundary information 102 does not include the group discrimination information 104, the group boundary information 102 shows the boundary between the groups, so that each of the plurality of subjects 10 having the same surname and the same name existing in different groups can be associated with each other.

Further, in a case where the group boundary information 102 includes the group discrimination information 104, the association unit 64 associates a test result related to the sample contained in each of the sample containers 13 with the test order further including the group discrimination information 104, based on the recognition result of the recognition unit 62 and the test order. In this case, by collating the group discrimination information 104 recognized from the label image 55 with the group discrimination information 104 (for example, "Company P" and "Company Q") included in the test order, each of the plurality of subjects 10 having the same surname and the same name existing in different groups can be associated with each other.

In the present embodiment, in a case where the display control unit 66 performs control such that label image 55, the test result, and the test order are displayed on the display 84 in association with each other, the display control unit 66 may perform control such that plural subjects 10 having the same surname and the same name existing in different groups are highlighted and displayed. For example, plural subjects 10 having the same surname and the same name may be highlighted and displayed with a different background color. In this case, the tester can confirm the existence of plural subjects 10 having the same surname and the same name existing in different groups.

As described above, the management system 20 according to the present embodiment is a management system including at least one processor, and the processor is configured to acquire an image obtained by imaging an outer surface of each of plural sample containers 13 and a boundary container, the sample container 13 containing a sample and in which subject information of a subject 10 from whom the sample is collected is given to the outer surface, the boundary container in which group boundary information 102 indicating a boundary between plural groups of subjects 10 is given to the outer surface in a case where there are the plurality of groups and the samples are continuously tested for the plurality of groups. Further, the processor is configured to recognize subject information given to each of the sample containers 13 and the group boundary information 102 given to the boundary container based on the image, and associate a test result related to the sample contained in each of the sample containers 13 with a test order which includes the subject information and in which the group is divided corresponding to the group boundary information 102, based on a result of the recognition and the test order.

With the management system 20 according to the present embodiment, it is possible to determine the boundary between groups without giving an identification unit such as a barcode to the sample container 13 as in the related art. Therefore, even though plural sample containers 13 included in each of plural different test orders are collectively set in the test device, the test result and the test order can be appropriately associated with each other. Further, for example, in a case where there are plural subjects 10 having the same surname and the same name in different groups, it is possible to more efficiently and appropriately associate the test result with the test order.

In the above embodiment, a case where the name information is used as information for specifying a subject and the plurality of subjects 10 having the same surname and the same name exist in different test orders (that is, different groups) has been described, but the present disclosure is not limited thereto. For any subject information other than name information, the management system 20 according to the present embodiment can also be applied to a case where the plurality of subjects 10 having the same subject information exist in different test orders. That is, in the present embodiment, the subject information given to the outer surface of the sample container 13 may not include the name information.

For example, as the subject information, a predetermined ID for each subject is given to the outer surface of the sample container 13, the recognition unit 62 may recognize the ID, and the association unit 64 may associate the test result with the test order based on the ID. In this case, even though the plurality of subjects 10 having the same ID exist in different test orders (that is, different groups), the boundary between the groups can be determined, so that the test result and the test order can be appropriately associated with each other.

Further, as the boundary container, for example, a dummy container 14 that does not contain a sample can be used in addition to the sample container 13 to which the group boundary information 102 is given as described above. FIG. 20 is a diagram showing an example in which a dummy container 14 in which no subject information is entered is used as an example. The dummy container 14 may have a shape that can be stored in the test device 21 for testing the sample contained in the sample container 13, and preferably has the same shape as the sample container 13.

In this case, the fact that the subject information is not entered on the outer surface of the dummy container 14 may be used as the group boundary information 102. As shown in FIG. 21, the association unit 64 determines the boundary of the group by the label image 55 of the dummy container 14 recognized that the subject information such as the name information is not given.

As shown in FIGS. 22 to 24, the group boundary information 102 and the group discrimination information 104 represented by at least one of a character or a symbol may be given to the outer surface of the dummy container 14. FIG. 22 shows an example of the dummy container 14 to which one line is given as an example of the group boundary information 102. FIG. 23 shows the dummy container 14 to which one line as an example of the group boundary information 102 and the characters "S" meaning the beginning of the group and "E" meaning the end of the group are given. FIG. 24 shows the dummy container 14 to which one line as an example of the group boundary information 102, and the characters "P" and "Q" are given. Of these, the characters "P" and "Q" also function as the group discrimination information 104 for discriminating the groups of company P and company Q, respectively.

As described above, according to the form in which the dummy container 14 is used, by giving the group boundary information 102 to the sample container 13, it is possible to suppress the difficulty in recognizing the subject information such as the name information. Therefore, it is possible to more appropriately associate the test result with the test order. Further, by preparing the dummy container 14 in advance, the work of giving the group boundary information 102 to the sample container 13 by the tester can be omitted, so that the efficiency of the test work can be improved.

The techniques disclosed in each of the above embodiments can be combined in any combination. For example, the test result related to the sample contained in the sample container 13 may be associated with the test order by using all of the subject discrimination information disclosed in the first embodiment and the group boundary information 102 and the group discrimination information 104 disclosed in the second embodiment.

Further, in each of the above embodiments, each functional unit included in the test device 21 and the management device 22 may be performed by an external device connected to the test device 21 and the management device 22. For example, the test device 21 may not include the imaging unit 52, the test device 21 may receive the label image 55 captured by an external imaging device such as a digital camera, and the received label image 55 may be output in association with the test result. Further, for example, the management device 22 may not include the recognition unit 62, and the management device 22 may receive the subject information, the group boundary information 102, and the group discrimination information 104 obtained by causing an external device having a character recognition function to recognize the label image 55.

In each of the above embodiments, for example, as hardware structures of processing units that execute various kinds of processing, such as the acquisition unit 60, the recognition unit 62, the association unit 64, and the display control unit 66, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (program).

One processing unit may be configured by one of the various processors, or configured by a combination of the same or different kinds of two or more processors (for example, a combination of plural FPGAs or a combination of the CPU and the FPGA). In addition, plural processing units may be configured by one processor. As an example where plural processing units are configured by one processor, first, there is a form in which one processor is configured by a combination of one or more CPUs and software as typified by a computer, such as a client or a server, and this processor functions as plural processing units. Second, there is a form in which a processor for realizing the function of the entire system including plural processing units by one integrated circuit (IC) chip as typified by a system on chip (SoC) or the like is used. As described above, various processing units are configured by using one or more of the above-described various processors as hardware structures.

Furthermore, as the hardware structure of the various processors, more specifically, an electrical circuit (circuitry) in which circuit elements such as semiconductor elements are combined can be used.

What is claimed is:

1. A management system comprising at least one processor, wherein the processor is configured to
    acquire an image obtained by imaging an outer surface of each of a plurality of sample containers and a boundary container, the sample container containing a sample and in which subject information of a subject from whom the sample is collected is given to the outer surface, the boundary container in which group boundary information indicating a boundary between a plurality of groups of subjects is given to the outer surface in a case where there are the plurality of groups and the samples are continuously tested for the plurality of groups,
    recognize the subject information given to each of the sample containers and the group boundary information given to the boundary container based on the image, and
    associate a test result related to the sample contained in each of the sample containers with a test order which includes the subject information and in which the group is divided corresponding to the group boundary information, based on a result of the recognition and the test order.

2. The management system according to claim 1, wherein the boundary container is a sample container containing a sample to be tested at at least one of first or last in the group.

3. The management system according to claim 1, wherein the boundary container is a dummy container which does not contain a sample.

4. The management system according to claim 3, wherein a fact that subject information is not entered on an outer surface of the dummy container is used as the group boundary information.

5. The management system according to claim 1, wherein the group boundary information includes group discrimination information for discriminating a group to which the subject belongs, and
    the processor is configured to
    further recognize the group discrimination information based on the image, and
    associate the test result related to the sample contained in each of the sample containers with the test order further including the group discrimination information, based on a result of the recognition and the test order.

6. The management system according to claim 1, wherein the group boundary information is represented by at least one of a character or a symbol.

7. The management system according to claim 1, wherein the processor is configured to
    perform control such that the test result and the test order are displayed on a display in association with each other.

8. The management system according to claim 1, wherein the processor is configured to
    generate a label image for each of a plurality of the subjects by extracting an area including the subject information from the image, and
    perform control such that the label image, the test result, and the test order are displayed on a display in association with each other based on the subject information included in the label image.

9. A management method comprising:
    acquiring an image obtained by imaging an outer surface of each of a plurality of sample containers and a boundary container, the sample container containing a sample and in which subject information of a subject from whom the sample is collected is given to the outer surface, the boundary container in which group boundary information indicating a boundary between a plurality of groups of subjects is given to the outer surface in a case where there are the plurality of groups and the samples are continuously tested for the plurality of groups;
    recognizing the subject information given to each of the sample containers and the group boundary information given to the boundary container based on the image; and
    associating a test result related to the sample contained in each of the sample containers with a test order which includes the subject information and in which the group is divided corresponding to the group boundary information, based on a result of the recognition and the test order.

10. A dummy container in which group boundary information indicating a boundary between a plurality of groups is given to an outer surface in a case where a plurality of sample containers each containing a sample and in which subject information of a subject from whom the sample is collected is given to an outer surface are divided into the plurality of groups to which the subject belongs and the samples are continuously tested for the plurality of groups.

11. The dummy container according to claim 10, wherein the group boundary information includes group discrimination information for discriminating a group to which the subject belongs.

12. The dummy container according to claim 10, wherein the group boundary information is represented by at least one of a character or a symbol.

13. The dummy container according to claim 10, wherein a fact that subject information is not entered on the outer surface of the dummy container is used as the group boundary information.

14. The dummy container according to claim 10, wherein the dummy container has a shape that is stored in a test device for testing the sample contained in the sample container.

15. The dummy container according to claim 14, wherein the dummy container has a shape similar to a shape of the sample container.

* * * * *